Dec. 12, 1939.　　　　O. B. NASH　　　　2,183,464
TRACTOR WHEEL LUG
Filed Feb. 11, 1939　　　　2 Sheets-Sheet 2
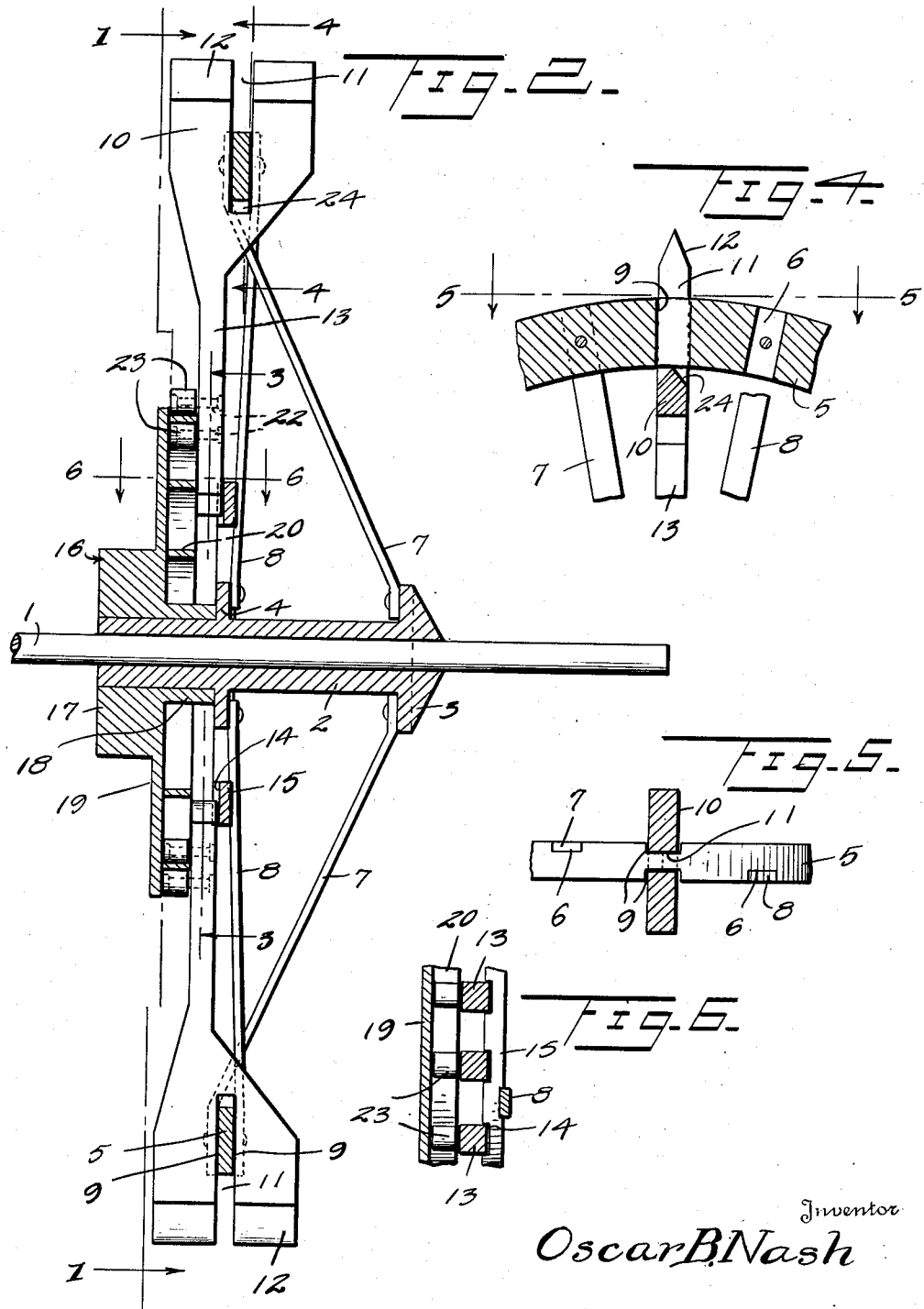
Inventor
Oscar B. Nash
By Watson E. Coleman
Attorney Patented Dec. 12, 1939

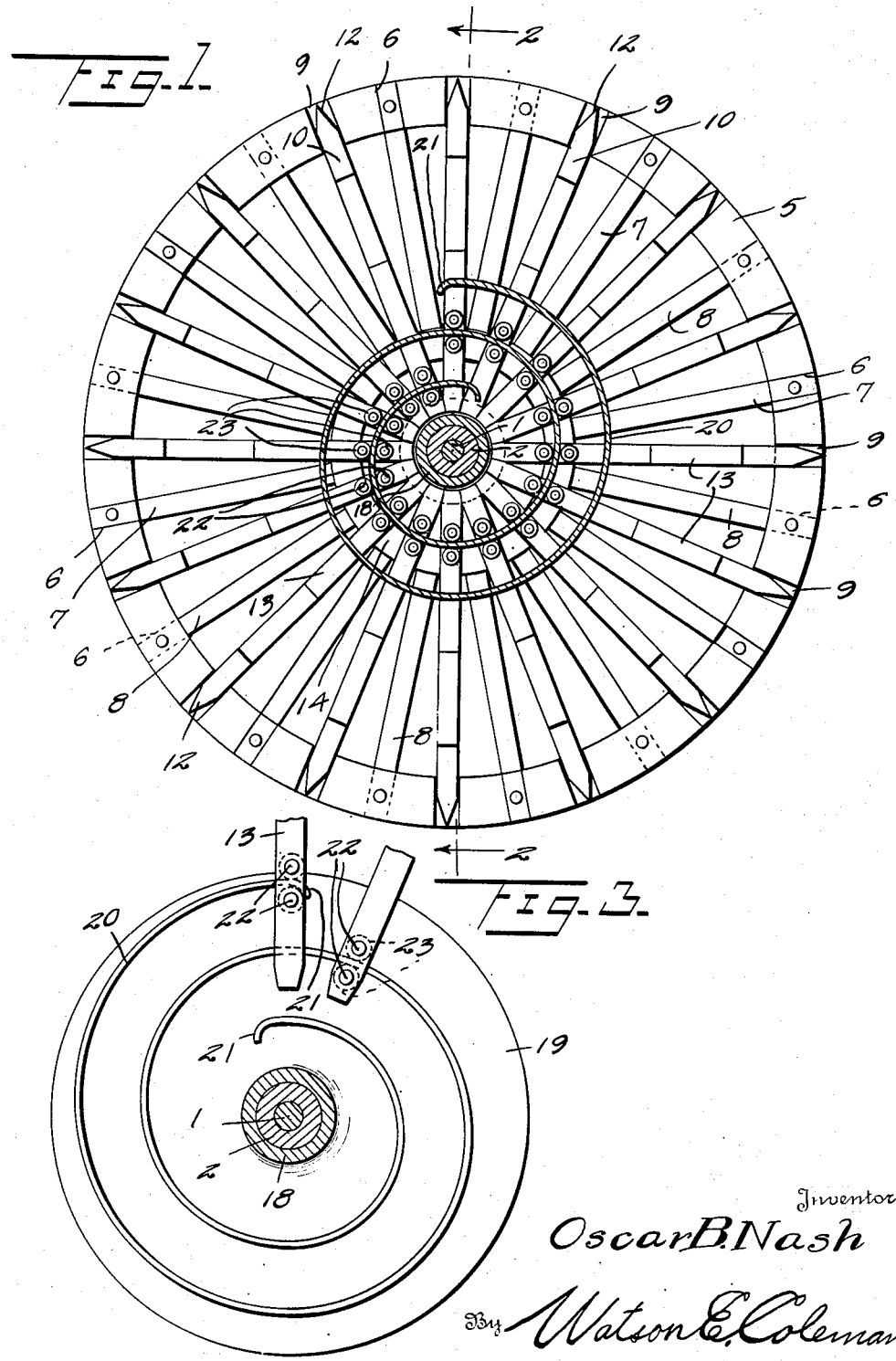

2,183,464

UNITED STATES PATENT OFFICE 2,183,464

TRACTOR WHEEL LUG

Oscar B. Nash, Adrian, Minn.

Application February 11, 1939, Serial No. 255,981

1 Claim. (Cl. 301—46)

This invention relates to improvements in vehicle wheels and pertains particularly to an improved and novel means for obtaining an increased traction effect for the wheels.

The present invention is designed primarily for tractor wheels and has for its principal object to provide a novel and improved mechanism whereby traction lugs carried by the wheel may be extended radially or retracted as desirable and within certain controlled limits, the projection of the lugs being governed by the character of the terrain over which the wheel is passing.

Another object of the invention is to provide a tractor wheel having radially extensible traction lugs, in which novel means is employed for the extension or retraction of the lugs through the application of the vehicle brake, the extension of the lugs being effected by the application of the brake while the vehicle is moving forward and the retraction of the lugs being effected by the application of the same brake while the vehicle is moving rearwardly.

A further object of the invention is to provide in a wheel of the above described character a novel means for supporting such traction lugs for the smooth radial movement of the same to operative or inoperative position.

A still further object of the invention is to provide in a wheel of the above described character having radially shiftable traction lugs, a novel means for clearing certain portions of the lug of impacted dirt or mud whereby interference of the movement of the lugs by such mud is avoided.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claim.

In the drawings:

Fig. 1 is a sectional view of the wheel structure embodying the present invention taken on the line 1—1 of Fig. 2.

Fig. 2 is a sectional view taken on the line 2—2 of Fig. 1.

Fig. 3 is a view looking at the spiral rib and showing the connection of two lug arms therewith, this view being a fragmentary section on the line 3—3 of Fig. 2.

Fig. 4 is a sectional view on the line 4—4 of Fig. 2.

Fig. 5 is a sectional view on the line 5—5 of Fig. 4.

Fig. 6 is a sectional view on the line 6—6 of Fig. 2.

Referring now more particularly to the drawings, the numeral 1 designates a portion of a vehicle axle or power shaft upon which a pair of wheels is mounted, one only of such wheels being here illustrated. The wheel in question constitutes the present invention and is provided with a hub 2, through which the axle shaft 1 passes and to which it is secured by suitable keys or other means. This hub may be provided with a head plate 3 at its outer end and an inner plate 4 spaced from the head plate 3 but also spaced inwardly from the opposite end of the hub from that end upon which the plate 3 is secured.

The numeral 5 designates the rim of the wheel and this rim is provided upon both side faces with transverse slots 6, the slots being radially arranged and those upon one side being in staggered relation with those upon the opposite side.

Secured to the head plate 3 is a series of outer spokes 7 which extend at their outer ends through the rim and are disposed within the slots 6 at the opposite side of the rim from the head to which they are attached. Secured to the inner plate 4 are inner spokes 8 which extend radially from the plate through the rim and have their outer ends secured in the slots 6 upon the outer side of the rim. While the rim 5 may be disposed in any plane desired with respect to the hub 2, it is here shown as being closer to the plane of the spoke plate 4 than to the plane of the head 3 so that the outer spokes 7 are disposed at a sharper angle to the hub 2 than are the inner spokes.

The wheel rim 5 has formed across the two faces thereof the radially extending oppositely disposed pairs of guide grooves 9, each pair of grooves being arranged midway between a pair of spokes. A pair of spokes is considered as being two adjacent inner and outer spokes 7 and 8. Disposed around the rim 5 are the lug plates or lugs 10, each of which is in the form of a relatively wide plate having a slot 11 formed therein from the relatively sharp outer edge portion 12 and the edges of the slot 11 engage in a pair of guide grooves 9, these grooves serving as a means for guiding the radial movement of the lug. Each lug has formed integrally therewith the radially inwardly extending arm 13, the inner ends of these arms terminating in relatively close proximity to the periphery of the spoke plate 4 and between the inner ends of a pair of spokes 8 attached to this plate.

The inner ends of the lug arms 13 are guided in their radial movement by guide grooves 14 formed across the annular guide member 15 which is secured to the outer faces of the inner spokes 8 concentrically with the hub 2.

Upon the inner end of the hub 2 there is mounted for free rotary movement about the hub the combined brake and spiral unit which is indicated as a whole by the numeral 16. This unit consists of a disk body 17, the periphery of which constitutes a drum face for the vehicle brake band (not shown) and this disk has formed integrally therewith the outwardly extending collar 18 which abuts against the inner side of the spoke plate 4, and also formed integrally with the disk 17 is a thin disk of greater diameter than the disk 17 and which is indicated by the numeral 19 and may be referred to as the spiral disk. The spiral disk 19 is disposed in a plane substantially midway between the ends of the unit 16 so that it is spaced from the disk 4 and from the inner sides of the lug arms 13 over the inner ends of which it projects or lies.

The outer face of the spiral disk 19, that is, the face which is directed toward the outer end of the hub 2 and which opposes the lug arms 13, has secured thereto the spiral rib 20 and which has two complete turns or convolutions. The ends of this spiral rib are turned in as indicated at 21, to constitute stops and the distance between the convolutions is approximately 4".

Upon the side of each lug arm 13 which opposes the edge of the spiral rib 20, there are secured two pivot lugs 22, each of which carries a roller 23. These rollers are spaced apart a sufficient distance to snugly receive the rib 20 therebetween. As shown in Fig. 2, the rib is of sufficient height or projects from the outer face of the disk 19 a sufficient distance to come into relatively close proximity to the arms 13. Thus the ribs on one side prevent any movement of the arms inwardly and the annulus or ring 15 upon the other side prevents any movement of the arms in the opposite direction or outwardly.

Each arm has the pair of rollers 23 placed thereon at a slightly different distance from the inner end of the arm than the pair of rollers upon each of the other arms and the arms when assembled, are arranged so that the pairs of rollers will define an involute curve or, in other words, will conform in curvature to one convolution of the spiral 20. When the arms 13 are all drawn inwardly so that the end edges of the lugs 10 will be flush with the periphery of the rim, the pairs of rollers will be in engagement with the inner convolution of the rib or, in other words, the pair of rollers nearest the hub will be at the inner end 21 and the last pair of the series will be disposed on the rib or in engagement with the rib at a point substantially between the inner and outer ends 21. When the lugs are all fully extended, the pair nearest the hub will be located substantially between the ends 21 and the pair farthest from the hub will be at the outer end 21 of the rib.

At the inner end of the slot 11 of each lug, the end wall of the slot is formed as an outwardly extending V 24, the point or edge of this V being midway between the side faces of the lug. This V-shaped portion or tooth is provided for the purpose of cutting out any mud or dirt which may become packed in the slot 11 when the lugs are retracted.

In the operation of the present wheel structure, if the lugs 10 are drawn in or retracted to the extent where the edges 12 will be in the plane of the outer edge of the rim 5, it will be apparent that the wheel may roll over a flat surface in the same manner as an ordinary flat rim. During such turning of the wheel, the brake drum and spiral units 16 will turn with the wheel. If it is desired to extend the lugs while the tractor or other structure upon which the wheel is mounted, is moving forwardly, this may be accomplished by applying the brake so as to grip the peripheral face of the disk 17. Thus the turning of the unit 16 will be stopped or will be checked while the wheel continues to rotate at the same speed and this effects the turning of the spiral rib in engagement with the rollers 23 so that the latter will move relatively around the rib from the inner end toward the outer end and consequently project the lugs outwardly.

The reverse movement of the lugs is accomplished by applying the brake to the disk 17 while moving the vehicle backwards.

From the foregoing, it will be readily apparent that the structure herein described is of relatively simple form and may be easily and inexpensively manufactured and that the actuation of the lugs is easily accomplished and is positive in that the extent to which the lugs may be moved may be controlled by varying the space between the convolutions of the spiral or by changing the number of such convolutions. With the structure herein described, the total possible movement of the lugs is approximately 8".

It will also be seen that if mud should become packed in the slot 11 when the lugs are retracted, this will be forced out by the tooth-like raised portion 24 at the inner end of the slot when the lug is projected as such portion 24 will press the mud against the inner edge of the wheel rim and will cut through and force the mud outward laterally from the lug.

What is claimed is:

A tractor wheel of the character described, comprising a wheel body including a hub, a rim and spokes connecting the hub and rim together, a circular plate mounted concentrically upon the hub at one end for free rotation thereabout, said plate having the periphery thereof designed for use as a brake band drum, a second plate integral and concentric with the first plate and of larger diameter than the same, said second plate being in spaced relation with certain spokes of the wheel at one side of the latter, a series of lugs mounted upon said rim for radial movement thereon, an arm carried by each lug and extending inwardly between the said second plate and the spokes adjacent thereto, a guide annulus secured to the last-mentioned spokes and concentric with the hub and having said arms engaging the sides thereof which opposes the second plate, a spiral rib formed upon that face of the second plate which opposes said annulus, the said arms being interposed between the edge of the rib and the annulus, and a pair of roller members carried by each arm and having the rib passing therebetween, the roller members of the arms being arranged in a spiral group corresponding with the spiral of the rib whereby upon rotary movement of the plates in one direction relative to the hub the lugs will be extended radially and upon reverse rotary movement of the plates relative to the hub the lugs will be retracted.

OSCAR B. NASH.